US012565331B2

(12) United States Patent
Kallergis et al.

(10) Patent No.: US 12,565,331 B2
(45) Date of Patent: Mar. 3, 2026

(54) FIRE DETECTION SYSTEM AND METHOD FOR MONITORING AN AIRCRAFT COMPARTMENT AND SUPPORTING A COCKPIT CREW WITH TAKING REMEDIAL ACTION IN CASE OF A FIRE ALARM

(71) Applicant: Airbus Operations GmbH, Hamburg (DE)

(72) Inventors: Konstantin Kallergis, Hamburg (DE); Bing Chen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 273 days.

(21) Appl. No.: 18/190,700

(22) Filed: Mar. 27, 2023

(65) Prior Publication Data

US 2023/0312131 A1　Oct. 5, 2023

(30) Foreign Application Priority Data

Mar. 31, 2022　(EP) ..................................... 22166090

(51) Int. Cl.
*B64D 45/00* (2006.01)
*G08B 17/00* (2006.01)

(52) U.S. Cl.
CPC ........ *B64D 45/00* (2013.01); *B64D 2045/009* (2013.01); *G08B 17/00* (2013.01)

(58) Field of Classification Search
CPC .. B64D 45/00; B64D 2045/009; G08B 17/00; G08B 29/188; A62C 3/08
See application file for complete search history.

(56) References Cited

U.S. PATENT DOCUMENTS

| | | | | |
|---|---|---|---|---|
| 9,257,048 | B1 * | 2/2016 | Offer | ......................... G08G 5/21 |
| 2008/0106437 | A1 * | 5/2008 | Zhang | .................... G08B 17/00 |
| | | | | 340/584 |

(Continued)

FOREIGN PATENT DOCUMENTS

| | | |
|---|---|---|
| DE | 10 2009 043 080 | 4/2011 |
| EP | 2 517 956 | 4/2012 |
| WO | 2007/027600 | 3/2007 |

OTHER PUBLICATIONS

European Search Report for European Patent Application No. 22166090 dated Sep. 13, 2022; priority document.

(Continued)

*Primary Examiner* — James J Lee
*Assistant Examiner* — Andrew Sang Kim
(74) *Attorney, Agent, or Firm* — Greer, Burns & Crain, Ltd.

(57) ABSTRACT

A fire detection system for monitoring an aircraft compartment and supporting a cockpit crew with taking remedial action in case of a fire alarm with a fire detector within the compartment; a monitoring system within the compartment to provide live monitoring data on cargo; a cargo tracking system configured to provide cargo data of the cargo; an aircraft control system configured to provide aircraft status data; a system control configured to assess a fire warning data, the cargo data and the aircraft status data and to provide a recommended remedial procedure based on the assessment in case the fire detector raises a fire alarm at least in an affected portion of the compartment; and a display device configured to display the live monitoring data and the recommended remedial procedure to the cockpit crew in case of a fire alarm

9 Claims, 1 Drawing Sheet

(56) References Cited

U.S. PATENT DOCUMENTS

| | | | |
|---|---|---|---|
| 2011/0240798 A1 | 10/2011 | Gershzohn et al. | |
| 2012/0275485 A1 | 11/2012 | Holzner et al. | |
| 2014/0313061 A1 | 10/2014 | Gatsonides et al. | |
| 2016/0104358 A1* | 4/2016 | Meier | G08B 29/22 |
| | | | 340/628 |
| 2018/0229062 A1* | 8/2018 | Meis | A62C 37/44 |
| 2022/0204180 A1* | 6/2022 | Sellmann | G01C 23/005 |

OTHER PUBLICATIONS

W. Krull et al., "Design and Test Methods for a Video-Based Cargo Fire Verification System for Commercial Aircraft" Universitat Duisburg-Essen, Campus Duisburg, Germany, Sep. 27, 2005.

* cited by examiner

FIRE DETECTION SYSTEM AND METHOD FOR MONITORING AN AIRCRAFT COMPARTMENT AND SUPPORTING A COCKPIT CREW WITH TAKING REMEDIAL ACTION IN CASE OF A FIRE ALARM

CROSS-REFERENCES TO RELATED APPLICATIONS

This application claims the benefit of European Patent Application No. 22166090-5 filed on Mar. 31, 2022, the entire disclosure of which is incorporated herein by way of reference.

FIELD OF INVENTION

The present invention pertains to a fire detection system and a method for monitoring an aircraft compartment and supporting a cockpit crew with taking remedial action in case of a fire alarm. The present invention further pertains to an aircraft equipped with such a system.

BACKGROUND OF INVENTION

Aircraft systems for the detection of fire in pressurized areas of a fuselage typically rely on smoke detectors, which are usually based on optical light scattering technologies. More recent smoke detectors implement smart sensors employing multi-wavelength detection, temperature evaluation and/or humidity assessment. These systems are particularly important in compartments that are not permanently occupied, and hence no crew members or passengers may be present that could raise an alarm. Examples for such compartments comprise the cargo hold as well as smaller enclosures comprising crew rest compartments and lavatories, for example.

When a fire warning is raised by such a system, it is usually automatically communicated via respective cabin intercommunication means to the cockpit, and more particular to an integrated electronic monitoring system, which provides the flight crew with instrumentation and crew annunciations for aircraft engines and other systems. The flight personal then normally have to take recommended remedial action themselves by checking a flight manual and/or checklist on how to proceed in the respective case. This means amongst others that the crew members have to decide whether there really is a fire or if it may be a false alarm. They also may have to check various parameters like fuel status, wind direction and speed, distance and route to next airport, availability of next airport and so on to make a decision on how and where to fly/land in case of a true positive alarm.

WO 2007/027600 A1 describes a fire sensor, a fire detection system and a fire suppression system for storage and/or cargo areas, e.g. on board of an aircraft. One or more fire temperature sensors may be located in a cargo area, e.g. above a cargo container, to detect the presence of a fire and/or a temperature higher than desired. Each such temperature sensor may contain a single sensing element or a matrix of individually packaged sensing elements, e.g. thermopiles.

EP 2 517 956 B1 describes a system for monitoring the temperature of a container or other piece of cargo disposed on a cargo hold floor, which comprises an IR sensor and/or IR camera to monitor the temperature of the cargo.

DE 10 2009 043 080 A1 describes a method for detecting smoke and/or flame in aircraft, which involves detecting real-time images of a measuring chamber, e.g. a cargo compartment, with an optical sensor as well as optically presenting real-time images by a display device.

SUMMARY OF INVENTION

Against this background, it is an object of the present invention to find automatized solutions for supporting the crew in case of a fire alarm with the assessment of the situation and with taking appropriate remedial action.

This object may be achieved by a fire detection system having the features of one or more embodiments described herein, an aircraft having the features of one or more embodiments described herein, and a method having the features of one or more embodiments described herein.

According to the invention, a fire detection system for monitoring an aircraft compartment and supporting a cockpit crew with taking remedial action in case of a fire alarm comprises a fire detector installed within the aircraft compartment and configured to provide fire warning data on a potential fire within the aircraft compartment; a monitoring system installed within the aircraft compartment and configured to provide live monitoring data on cargo stored in a monitored area of the aircraft compartment; a cargo tracking system configured to provide cargo data of the cargo stored in the monitored area comprising at least one of cargo identification data, cargo type data and cargo status data; an aircraft control system configured to provide aircraft status data comprising at least one of environmental data, fuel status data, navigation data, passenger data and crew data; a system control configured to assess the fire warning data, the cargo data and the aircraft status data and to provide a recommended remedial procedure based on the assessment in case the fire detector raises a fire alarm at least in an affected portion of the monitored area of the aircraft compartment; and a display device configured to display the live monitoring data and the recommended remedial procedure to the cockpit crew in case of a fire alarm.

Further according to the invention, an aircraft is equipped with a fire detection system according to the invention.

Further according to the invention, a method for monitoring an aircraft compartment and supporting a cockpit crew with taking remedial action in case of a fire alarm comprises providing fire warning data on a potential fire within the aircraft compartment with a fire detector; providing live monitoring data on cargo stored in a monitored area of the aircraft compartment with a monitoring system; providing cargo data of the cargo stored in the monitored area comprising at least one of cargo identification data, cargo type data and cargo status data with a cargo tracking system; providing aircraft status data comprising at least one of environmental data, fuel status data, navigation data, passenger data and crew data with an aircraft control system; assessing with a system control the fire warning data, the cargo data and the aircraft status data and providing a recommended remedial procedure based on the assessment in case the fire detector raises a fire alarm at least in an affected portion of the monitored area of the aircraft compartment; and displaying the live monitoring data and the recommended remedial procedure to the cockpit crew in case of a fire alarm with a display device.

Thus, the present invention contemplates transforming a conventionally standalone fire detection system into a holistic system that integrates seamlessly with further systems on board of the aircraft, thereby taking various data into account that are potentially relevant for assessing whether a fire alarm is a false alarm or not and for deciding on the best way to remedy the respective situation. In other words, the present system and method do not merely detect a (potential) fire but in addition manage all relevant data and the necessary and/or recommended remedial actions in order to support the aircraft crew on making a decision on the status of the affected compartment and on handling the aircraft in an optimal way. As a consequence, emergency situations can be handled by the crew much more swiftly and effectively as this information are provided automatically and do not need to be retrieved manually from check lists or flight manuals.

To this end, the invention incorporates several subsystems that may already be provided on board of aircraft for other purposes or that may be provided specifically for the present use case. These systems comprise amongst others a monitoring system that is provided in the respective compartment for additional observation of the cargo. The respective monitoring information, e.g. a live feed of one or several cameras, is displayed to the cockpit crew so that they are able to assess the situation more directly and can confirm visually whether a fire alarm relates to a real fire or not. Moreover, the status of the monitored cargo can be assessed before, during and/or after activation of fire suppression means.

Furthermore, a cargo tracking system provides the cockpit crew with additional information on what is actually loaded in the potentially affected portion of the compartment. These data may also contain information on the current status of the cargo and/or its contents. In one example, a smart container solution based on RFID or other suitable technologies may be used to track individual cargo elements into and through a cargo hold to be able to identify what kind of load is located in the vicinity of the detector giving the fire alarm. Various additional smart sensor systems may be provided on the cargo, e.g. on unit load devices or pallets or the like. Such information may then be taken into account for the further procedure.

For example, if vegetables like broccoli or salad are loaded within the compartment, the probability for a false alarm may be larger due to the increased humidity stemming from condensation effects at high altitudes. As another example, lithium cells or other highly fire sensitive electronic equipment may be loaded within the compartment, which may provoke immediate emergency procedure.

Moreover, an aircraft control system provides various additional information relevant for the system and the cockpit crew to establish the best course of action. In common systems, the crew have to work out and perform the necessary actions themselves after a fire alarm is raised. The present invention now suggests utilizing any kind of data collected by the aircraft systems during flight in order to automatically establish a recommended way of procedure in order to support the crew. The crew thus no longer have to search through manuals under high stress.

Instead, the data may be collected in an "Internet of Things" (IoT) backbone of the respective aircraft. Such information and data may comprise, for example, wind speed, wind direction, bad weather zones, fuel status, fuel consumption, flights routes, flight profiles, directions and distances to airports, availability of airports, aircraft rescue and/or passenger emergency availabilities of next suitable airports and so on. These data may be collected by various distributed systems of the respective aircraft comprising amongst others sensor systems.

All the above data are then collected and analyzed by a computing system of the system control in order to assess, for example, the type of fire alarm and the likelihood for the alarm to be correct. On such a basis, recommendations for suitable remedial actions may then be proposed and/or even initiated by the system control. The relevant results are then displayed to the cockpit crew by a suitable device, e.g. an overhead display, on which the crew may also check the live monitoring data of the affected portion of the aircraft compartment, e.g. a cargo hold.

While conventional systems only provide a fire warning such as, for example, "fire in forward cargo hold". The present system is now able to provide much more detailed information, e.g. "the cargo load in the affected area is fire sensitive", "this is a view into the affected zone", "the most suitable airport is airport X, which is Z km farther away than Airport Y, but has more appropriate runway length for this aircraft" etc.

Advantageous embodiments and improvements of the present invention are found in the additional embodiments.

According to an embodiment of the invention, the monitoring system may comprise a camera. The monitoring system may particularly comprise an infrared camera.

The camera may be provided to visually monitor the cargo in the specific portion of the compartment. In case of an IR camera, also the current temperature of the cargo may be monitored.

According to an embodiment of the invention, the system control may be configured to assess whether the cargo in the affected portion is hygroscopic, temperature sensitive, flammable and/or explosive.

Hygroscopic cargo has natural water and/or moisture content, which means that it readily contains, gives off and/or absorbs moisture. Hygroscopic cargo comprises amongst others vegetables or cargo of vegetable origin. For example, agricultural cargo is typically hygroscopic and has relevant moisture content that can interact with the air. Due to the potentially increased humidity within the compartment due to this specific type of cargo, there may be a higher likelihood for a false alarm. Hence, any knowledge about the type of cargo may further help to refine the assessment of the situation in case of a fire alarm. In a similar vein, the remedial action may be affected in case that certain types of cargo are present, e.g. temperature sensitive, flammable or even explosive cargo.

According to an embodiment of the invention, the recommended remedial procedure may comprise a navigation recommendation for the cockpit crew for an emergency landing and/or a reachable airport.

The system may thus provide the crew with the best suited landing procedure and/or landing destination for the specific situation at hand. This decision may, for example, depend on the type of cargo, the seriousness of the fire alarm, the weather conditions, the remaining fuel, potential obstacles or problematic weather zones on the route etc.

According to an embodiment of the invention, the system control may be communicatively coupled to and/or integrated in a cabin intercommunication system.

The system may thus be seamlessly integrated in and/or replace the communication systems already present on the aircraft in order to provide information to the crew, in particular in the cockpit.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION OF THE PREFERRED EMBODIMENTS

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
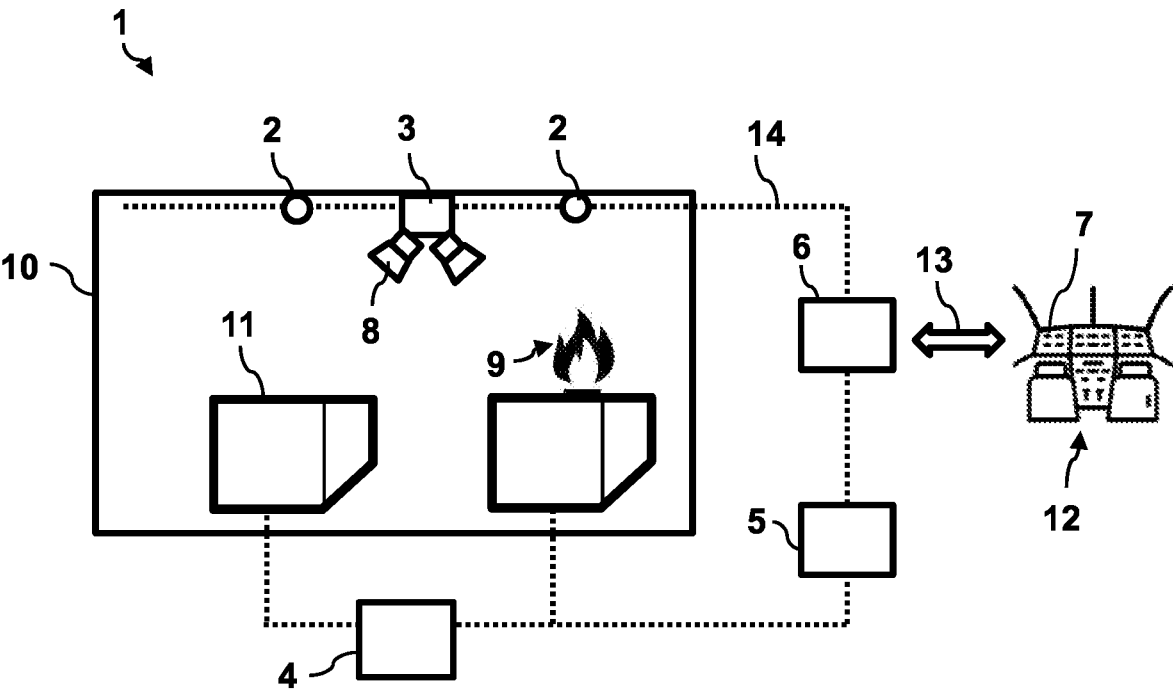
FIG. 1 schematically depicts a fire detection system according to an embodiment of the invention.
Figure 2:
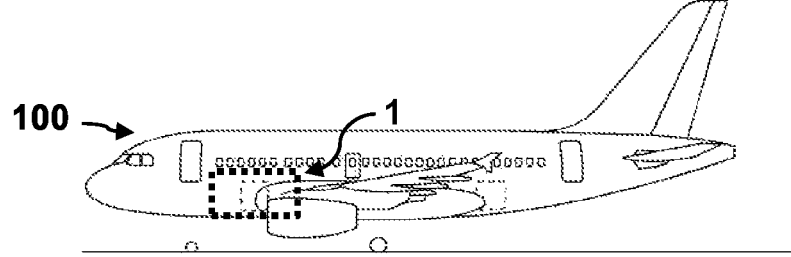
FIG. 2 schematically depicts an aircraft equipped with the fire detection system of FIG. 1.
Figure 3:
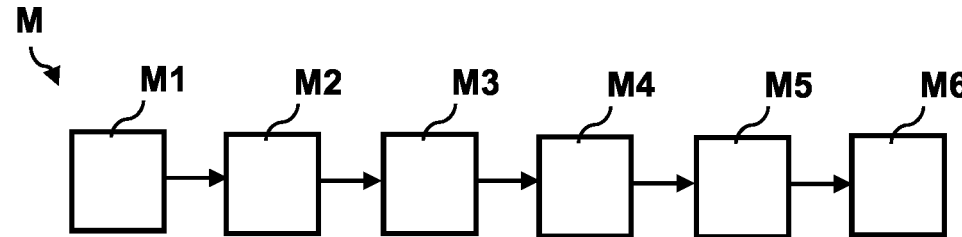
FIG. 3 depicts a schematic flow diagram of a method for monitoring an aircraft compartment and supporting a cockpit crew with taking remedial action in case of a fire alarm utilizing the fire detection system of FIG. 1.

FIG. 1 schematically depicts a fire detection system 1 according to an embodiment of the invention, which is provided for monitoring an aircraft compartment 10, e.g. a cargo hold of the passenger aircraft 100 exemplarily shown in FIG. 2, and for supporting a cockpit crew 12 with taking remedial action in case of a fire alarm. A corresponding method M is shown in FIG. 3 as a schematic flow diagram. The system 1 and method M are provided to overcome certain drawbacks of conventional approaches to fire detection on aircraft. The present invention particularly is provided to increase the level of automation in such systems compared to conventional solutions often still relying to a large extend on manual activity of the crew members in case of a fire alarm and under high stress situations.

Active fire protection onboard of aircraft usually comprise two basic systems. The first one is a fire detection system (e.g. a smoke detection system) to detect occurring fires. These systems are often placed in any compartment of the aircraft that are not permanently occupied such that a fire would not be noticed by crew members or passengers. The largest such compartment equipped with such a system is the cargo hold. Smaller ones comprise crew rest compartments and lavatories. The second system, which works in collaboration with the first system, is the fire suppression system. The latter typically employs a fire extinguishant, e.g. a gas, water and/or aerosols, which is applied in the affected area to extinguish or suppress the detected fire and/or keep it under control until the aircraft has landed safely.

Modern systems usually comprise different sensor technologies to reduce the likelihood of false alarms. For example, optical (multi-frequency) sensors are often combined with temperature sensors and/or humidity sensors. Much progress has been made on the reliable detection of fires on board of aircraft. However, the procedure in case of a fire alarm has not been changed relevantly. The fire alarm is normally sent via cabin intercommunication means to the cockpit, where the pilots have to check the flight manuals for further steps. They have to decide under significant mental stress whether there really is a fire and then take the necessary remedial actions.

The present solution described now with reference to FIGS. 1 to 3 overcomes these drawbacks by combining various data from different onboard systems in order to provide an automatic check of the fire alarm and to suggest and/or initiate adequate remedial actions.

With reference to FIG. 1, the system 1 comprises one or several fire detectors 2 installed within the aircraft compartment 10 of the aircraft 100 and configured to provide fire warning data on a potential fire 9 within the aircraft compartment 10. Each fire detector 2 may comprise various sensor technologies as they are commonly known in this technological field comprising amongst others optical smoke detectors, temperature sensors (for absolute or relative temperatures as well as gradients), gas detectors like electronic noses or similar for detecting liquid hydrogen for example, humidity sensors and so on. In the embodiment shown in FIG. 1, the compartment 10 is a cargo hold containing several cargo elements, e.g. unit load devices or the like. The sensors of the fire detector 2 may be adequately distributed over a wall, a ceiling and/or a floor of the compartment 10 in order to be able to assign a position to a detected fire within the compartment.

The system 1 further comprises a monitoring system 3 installed within the aircraft compartment 10 and configured to provide live monitoring data on cargo 11 stored in a monitored area of the aircraft compartment 10. The monitoring system 3 of this embodiment comprises several cameras 8 installed at different positions and with different fields of views in the compartment 10. The cameras 8 may comprise optical as well as IR cameras, for example, and may be configured to provide a live video feed of their respective field of view. These cameras 8 may monitor individual cargo 11 elements or entire portions of the compartment 10.

The system 1 further comprises a cargo tracking system 4 configured to provide cargo data of the cargo 11 stored in the monitored area comprising cargo identification data, cargo type data and/or cargo status data. For example, the cargo tracking system 4 may be a semi- or fully automated cargo loading system with on various sensors of the same or differing technologies to identify and track each piece of cargo 11 as well as actuators to actuate movement of the cargo 11. However, in other embodiments, the cargo tracking system 4 may merely provide certain data on the pieces of cargo 11 stored in the compartment without any elaborate sensing technology and without automatized transport. For example, the cargo tracking system 4 may merely provide a map of the compartment 10 including the final position and type of each piece of cargo 11 without any active tracking of each piece of cargo 11 during loading.

The system 1 further comprises an aircraft control system 5 configured to provide aircraft status data comprising environmental data (e.g. current and/or forecasted weather data, wind, temperature etc.), fuel status data, navigation data (e.g. planned route, routes to closest airports), passenger data (e.g. seating plan, health information on individual passengers) and/or crew data or any other information helpful for the present purpose. The aircraft control system 5 may be a computer on the aircraft which obtains the data from various sensors.

All of these subsystems may be communicatively coupled with each other and with a system control 6, e.g. via wired and/or wireless data links 14. The system control 6 is a computing system that may be communicatively coupled to and/or be part of a cabin intercommunication system 13 of the aircraft 100. The system control 6 collects and analyzes the data and provides a recommended remedial procedure based on the assessment in case the fire detector 2 raises a fire alarm at least in an affected portion of the monitored area of the aircraft compartment 10.

For example, the piece of cargo 11 shown on the right hand side of the compartment 10 in FIG. 1 may raise a fire alarm, e.g. due to an increased temperature above the piece of cargo 11 surpassing a certain minimal temperature. The potential fire 9 is detected by the fire detector 2 above the piece of cargo 11 and monitored by the monitoring system 3. At the same time, a position of the affected piece of cargo 11 can be determined on basis of information from the cargo tracking system 4.

Moreover, the type and status of the particular piece of cargo 11 may be determined. For example, the system control 6 may determine whether the cargo 11 in the affected portion is hygroscopic, temperature sensitive, flammable and/or explosive. A hygroscopic cargo, for example, may raise the probability of a false alarm due to potentially increased humidity within the cargo hold around the respective piece of cargo 11. Flammable or even explosive cargo on the other hand may provoke immediate counter measures in case of a fire alarm irrespective of the respective confidence level on the correctness of the alarm.

The system 1 further comprises a display device 7 configured to display the live monitoring data and the recommended remedial procedure to the cockpit crew 12 in case of a fire alarm. Hence, the crew 12 is able to receive a live feed of the affected portion in the cargo compartment 10 to visually countercheck if there is a fire or not. In addition, emergency procedures are automatically displayed to the crew 12 on the display, e.g. navigation recommendation for an emergency landing and/or a recommended reachable airport, evacuation and/or rescue management information, medical information of specific passengers and so on. The crew 12 are thus able to directly act in case of a fire warning and do not have to make elaborate manual checks of flight manuals or the like. The crew 12 can thus react much more effectively and swiftly in case of a fire alarm.

The method M of FIG. 3 correspondingly comprises under M1 providing fire warning data on a potential fire 9 within the aircraft compartment 10 with the fire detector 2. The method M further comprises under M2 providing live monitoring data on the cargo 11 stored in the monitored area of the aircraft compartment 10 with the monitoring system 3. The method M further comprises under M3 providing cargo data of the cargo 11 stored in the monitored area comprising cargo identification data, cargo type data and/or cargo status data with the cargo tracking system 4. The method M further comprises under M4 providing aircraft status data comprising environmental data, fuel status data, navigation data, passenger data and/or crew data with the aircraft control system 5. The method M further comprises under M5 assessing with the system control 6 the fire warning data, the cargo data and the aircraft status data and providing a recommended remedial procedure based on the assessment in case the fire detector 2 raises a fire alarm at least in an affected portion of the monitored area of the aircraft compartment 10.

Finally, the method M comprises under M6 displaying the live monitoring data and the recommended remedial procedure to the cockpit crew 12 in case of a fire alarm with the display device 7.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the invention and its practical applications, to thereby enable others skilled in the art to best utilize the invention and various embodiments with various modifications as are suited to the particular use contemplated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage
14 wing
16 engine
18 aft section
20 fuel tank
22 tank wall
24 wall portion
26 rib
28 stringer
30 skin
32 man-hole portion
34 tank wall liner
36 bottom portion
38 liner body
40 mounting surface
42 cut-out
44 fasteners
45 cured sealant
46 reinforcement layer
48 through-holes
50 protrusion
52 inner surface
54 main body

The invention claimed is:

1. A fire detection system for monitoring an aircraft compartment and supporting a cockpit crew with taking remedial action in case of a fire alarm, the fire detection system comprising:
   a fire detector installed within the aircraft compartment and configured to provide fire warning data on a potential fire within the aircraft compartment;
   a monitoring system installed within the aircraft compartment and configured to provide live monitoring data on cargo stored in a monitored area of the aircraft compartment;
   a cargo tracking system configured to provide cargo data of the cargo stored in the monitored area comprising cargo identification data, cargo type data and cargo status data;

an aircraft control system configured to provide aircraft status data comprising at least one of environmental data, fuel status data, navigation data, passenger data and crew data;
   a system control configured to assess the fire warning data, the cargo data and the aircraft status data and to provide a recommended remedial procedure based on an assessment when the fire detector raises a fire alarm at least in an affected portion of the monitored area of the aircraft compartment,
   wherein a basis of the assessment of the fire warning data comprises the cargo identification data, the cargo type data and the cargo status data and whether the cargo in the affected portion is at least one of hygroscopic, temperature sensitive, flammable, and explosive; and
   a display device configured to display the live monitoring data and the recommended remedial procedure based on the assessment to the cockpit crew when the fire detector raises the fire alarm,
   wherein the recommended remedial procedure comprises a navigation recommendation for the cockpit crew.

2. The fire detection system according to claim 1, wherein the monitoring system comprises a camera.

3. The fire detection system according to claim 1, wherein the monitoring system comprises an infrared camera.

4. The fire detection system according to claim 1, wherein the navigation recommendation for the cockpit crew is at least one of an emergency landing and a reachable airport.

5. The fire detection system according to claim 1, wherein the system control is at least one of communicatively coupled to and integrated in a cabin intercommunication system.

6. An aircraft equipped with the fire detection system according to claim 1.

7. A method for monitoring an aircraft compartment and supporting a cockpit crew with taking remedial action in case of a fire alarm, the method comprising:
   providing fire warning data on a potential fire within the aircraft compartment with a fire detector;
   providing live monitoring data on cargo stored in a monitored area of the aircraft compartment with a monitoring system;
   providing cargo data of the cargo stored in the monitored area comprising cargo identification data, cargo type data and cargo status data with a cargo tracking system;
   providing aircraft status data comprising at least one of environmental data, fuel status data, navigation data, passenger data and crew data with an aircraft control system;
   assessing with a system control the fire warning data, the cargo data and the aircraft status data and providing a recommended remedial procedure based on an assessment in case the fire detector raises a fire alarm at least in an affected portion of the monitored area of the aircraft compartment,
   wherein a basis of the assessment of the fire warning data comprises the cargo identification data, the cargo type data and the cargo status data and whether the cargo in the affected portion is at least one of hygroscopic, temperature sensitive, flammable, and explosive; and,
   displaying the live monitoring data and the recommended remedial procedure to the cockpit crew when the fire detector raises the fire alarm with a display device,
   wherein the recommended remedial procedure based on the assessment comprises a navigation recommendation for the cockpit crew for at least one of an emergency landing and a reachable airport.

8. The method according to claim 7, wherein the system control is at least one of communicatively coupled to and integrated in a cabin intercommunication system.

9. A fire detection system for monitoring an aircraft compartment and supporting a cockpit crew with taking remedial action in case of a fire alarm, the fire detection system comprising:

a fire detector installed within the aircraft compartment and configured to provide fire warning data on a potential fire within the aircraft compartment;

a monitoring system installed within the aircraft compartment and configured to provide live monitoring data on cargo stored in a monitored area of the aircraft compartment;

a cargo tracking system configured to provide cargo data of the cargo stored in the monitored area comprising cargo identification data, cargo type data and cargo status data;

an aircraft control system configured to provide aircraft status data comprising at least one of environmental data, fuel status data, navigation data, passenger data and crew data;

a system control configured to assess the fire warning data, the cargo data and the aircraft status data and to provide a recommended remedial procedure based on an assessment when the fire detector raises a fire alarm at least in an affected portion of the monitored area of the aircraft compartment, wherein a basis of the assessment of the fire warning data comprises the cargo identification data, the cargo type data and the cargo status data and whether the cargo in the affected portion is at least one of hygroscopic, temperature sensitive, flammable, and explosive; and a display device configured to display the live monitoring data and the recommended remedial procedure to the cockpit crew when the fire detector raises the fire alarm, wherein the recommended remedial procedure based on the assessment comprises a navigation recommendation for the cockpit crew for at least one of an emergency landing and a reachable airport.

\* \* \* \* \*